Feb. 4, 1936. G. R. BENNETT 2,029,906
COMPOSITE STRUCTURE
Filed Sept. 10, 1934 2 Sheets-Sheet 1
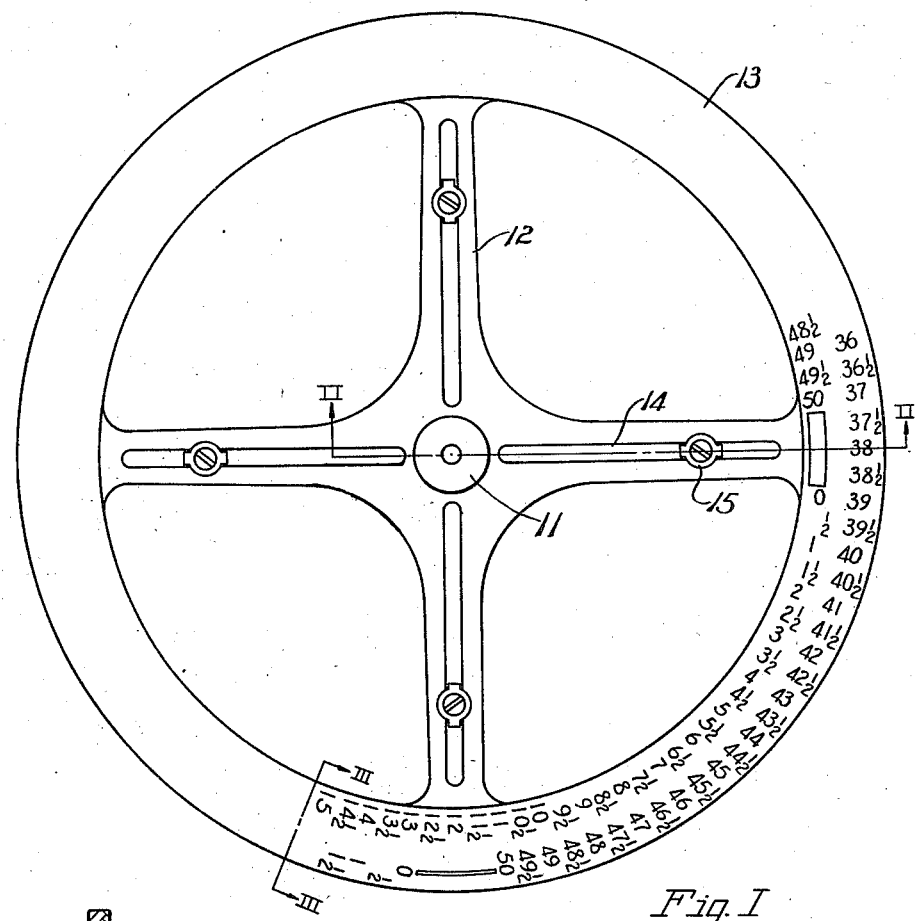
Fig. I
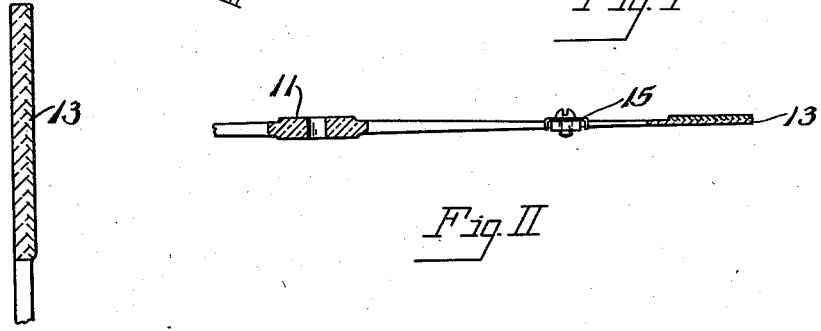
Fig. II
Fig. III
Geoffrey R. Bennett
INVENTOR
BY [signature]
ATTORNEY Feb. 4, 1936.  G. R. BENNETT  2,029,906
COMPOSITE STRUCTURE
Filed Sept. 10, 1934  2 Sheets-Sheet 2
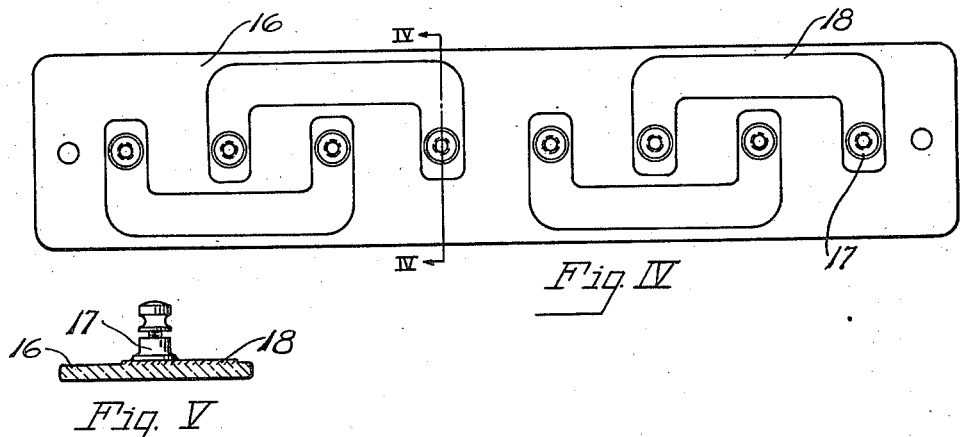
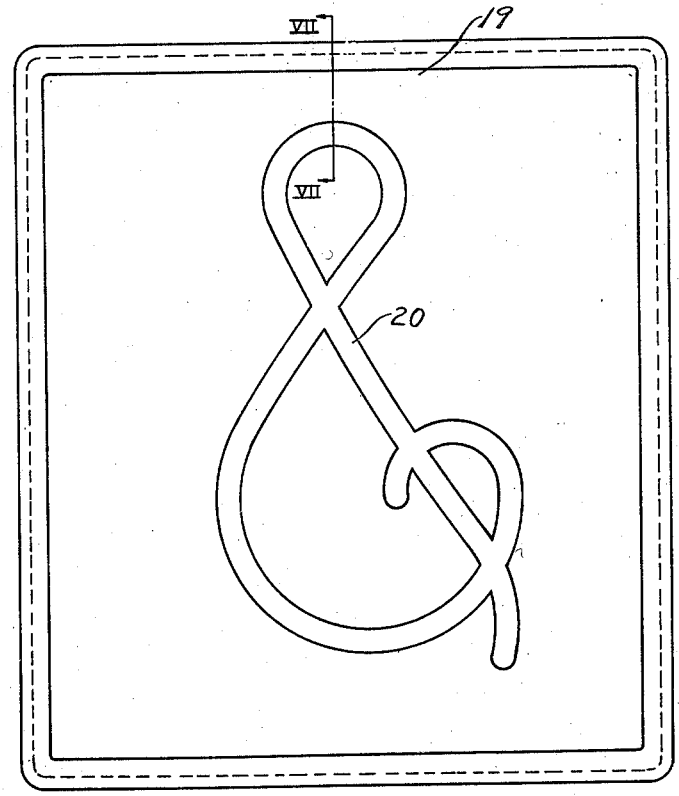
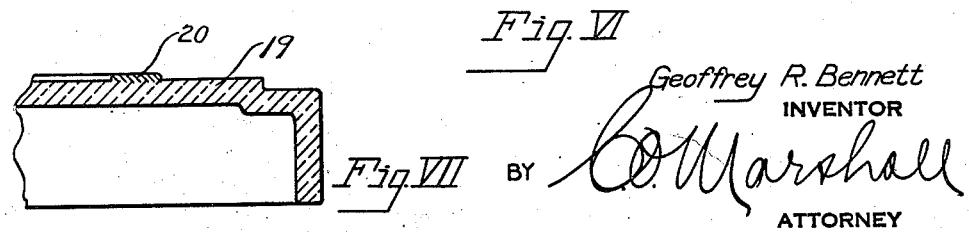
Geoffrey R. Bennett
INVENTOR
BY
ATTORNEY

UNITED STATES PATENT OFFICE 2,029,906

COMPOSITE STRUCTURE

Geoffrey R. Bennett, Toledo, Ohio, assignor to Toledo Scale Manufacturing Company, Toledo, Ohio, a corporation of New Jersey Application September 10, 1934, Serial No. 743,491

6 Claims. (Cl. 101—401.1)

A type carrying wheel or disk that is moved into printing position by the automatic mechanism of a weighing scale must have minimum weight and inertia. Otherwise the friction in the bearings that support the type carrying wheel is liable to cause appreciable errors in the printed weight, and the flywheel effect of the wheel may prevent it from responding instantly to increases and decreases of load. Furthermore, the mechanism that positions the type carrying wheel is necessarily of precise and somewhat delicate construction, so that its useful life is shortened by the strain and battering incident to sudden starting and stopping of a heavy wheel.

For these reasons such wheels are usually designed to be as light as their type carrying function will permit. They have for example been constructed with metal hubs, wire spokes and wooden rims, like bicycle wheels, the type being formed on metal strips riveted to the rims. Such structures are not as light as is desirable and, because of the necessity of micrometrically exact location of each character, proper attachment of the type carrying strips is difficult and expensive.

The principal object of this invention is to provide a composite structure, such as a printing wheel, having light weight and a hard surface upon which characters may be etched.

More specific objects and advantages are apparent from the description, in which reference is had to the accompanying drawings illustrating preferred embodiments of the invention.

Figure I of the drawings is an elevational view of a printing wheel embodying the composite structure of the invention.

Figure II is a fragmentary sectional view on line II—II of Figure I.

Figure III is an enlarged fragmentary sectional view of the rim of the printing wheel on line III—III of Figure I showing its composite structure.

Figure IV is an elevational view of a bus-bar embodying the composite structure of the invention.

Figure V is a sectional view on line V—V of Figure IV.

Figure VI is an elevational view of an ornamental panel embodying the composite structure of the invention.

Figure VII is an enlarged fragmentary sectional view on line VII—VII of Figure VI.

But these specific drawings and the specific description that follows are to disclose and illustrate the invention and not to impose limitations upon the claims.

In the manufacture of a type carrying wheel embodying the invention such as that illustrated, the body of the wheel is made of a molded plastic such as urea-formaldehyde resin containing a cellulose filler. The wheel as molded consists of a hub 11, spokes 12 and a rim 13, the spokes having slots 14 to receive balancing weights 15 which may be shifted radially to balance the wheel when it is assembled in a weighing mechanism.

After the molding operation the hub and spokes of the wheel are covered by a mask and a layer of metal, preferably steel sprayed in finely divided molten form, is impacted upon one side of the rim. Owing to the nature of the formaldehyde-urea cellulose material of which the body of the wheel is made, the metallic particles that first strike the surface are firmly incorporated therewith. In some cases, however, it is desirable to increase the mechanical strength of the bond by a preliminary roughening of the resinous surface.

After a layer of steel, the thickness of which is slightly greater than the height desired for the type, has been thus incorporated with the resinous wheel body, the surface of the steel is smoothed by buffing, characters are printed upon the smooth surface in a masking substance capable of inhibiting the action of an etching fluid and the portions of the steel surface not coated by the masking substance are removed by etching to a depth nearly equal to the height of the steel type. The resulting structure is a light wheel efficaciously proportioned, with a rim on one side of which is a thin steel sheath having integrally formed type projecting from its surface. If desired, brass, duralumin and other metals may be substituted for steel.

The composite structure of the invention makes possible the economical production of a featherweight wheel formed to attain maximum strength and bearing accurately located, sharply etched indicia.

In the manufacture of a bus-bar such as that illustrated in Figures IV and V and in making similar structures according to the invention, the body 16 is molded of electrically non-conducting material such as formaldehyde-urea resin containing cellulose filler. A mask of pressure-adhesive paper or the like having openings, the location and shape of which are those desired for the electrically conducting portions, is placed upon the body member and conducting metal, such as copper sprayed in finely divided molten form, is impacted upon the resinous body member through the openings in the mask. If desired a mask of soft rubber may be employed, and the unmasked portions of the body member may be treated by sand blasting before the metal is impacted onto them. After the treatment with sprayed metal the mask is removed and terminals 17 are soldered upon the metal portions 18.

In the manufacture of ornamental composite structures of synthetic resin and metal of cameo-like appearance such as that illustrated in Figures VI and VII, the resinous body 19 is molded in the desired form with or without molded ornamentation, an adhesive mask having openings corresponding to the desired metallic configuration is applied to the molded body, and metal 20 is incorporated with the unmasked portions in the manner heretofore described.

Changes in the details of the process and the form of the product may be made to adapt the invention to various conditions.

Having described my invention, I claim:

1. A printing wheel for a weighing scale comprising a wheel body of light weight molded plastic having a thin sheath of metal over one portion with raised characters integral with the metal sheath.

2. The method of making composite articles that includes molding the body of the article from a plastic, spraying on a surface of the molded body a layer of metal of substantial thickness, covering with a masking coat parts of the metal surface to be left in relief, and etching away metal from the surface exposed by the masking coat, thereby leaving sharply-defined raised portions.

3. The method of manufacturing printing wheels for weighing scales that includes molding a body from synthetic resin, covering a part of the surface thereof with a mask, spraying a layer of metal on a part of the surface which is exposed by the mask, covering a part of the metal surface with a masking coat, and etching metal away from the part of the metal surface exposed by the masking coat.

4. A printing wheel for a weighing scale comprising a wheel body of synthetic resin having a layer of metal impacted onto a portion thereof and partially etched away, said layer having distinct raised printing characters integral with unetched portions.

5. A method of manufacturing printing wheels for weighing scales that comprises molding a body from a plastic, impacting a layer of metal onto a portion of the surface of the body, and etching metal away from a part of the layer of metal to leave distinct raised printing characters integral with the layer.

6. A composite structure comprising a base of synthetic resin and a layer of metal impacted thereon, the surface of said layer of metal being partially etched away and having unetched portions in distinct relief integral therewith.

GEOFFREY R. BENNETT.